(12) United States Patent
Mohammed et al.

(10) Patent No.: US 12,461,899 B2
(45) Date of Patent: Nov. 4, 2025

(54) AUTOMATIC SEQUENCING OF DATABASE OBJECTS

(71) Applicant: Dell Products L.P., Round Rock, TX (US)

(72) Inventors: Jahangeer Pasha Mohammed, Milton (CA); Polu Ram Charan Teja, Hyderabad (IN)

(73) Assignee: Dell Products L.P., Round Rock, TX (US)

( * ) Notice: Subject to any disclaimer, the term of this patent is extended or adjusted under 35 U.S.C. 154(b) by 23 days.

(21) Appl. No.: 17/725,968

(22) Filed: Apr. 21, 2022

(65) Prior Publication Data

US 2023/0342341 A1 Oct. 26, 2023

(51) Int. Cl.
*G06F 16/21* (2019.01)
*G06F 9/48* (2006.01)

(52) U.S. Cl.
CPC .......... *G06F 16/212* (2019.01); *G06F 9/4881* (2013.01)

(58) Field of Classification Search
CPC .............................. G06F 16/212; G06F 9/4881
See application file for complete search history.

(56) References Cited

U.S. PATENT DOCUMENTS

| | | | |
|---|---|---|---|
| 6,985,901 B1 * | 1/2006 | Sachse ................ | H04L 41/5032 709/224 |
| 9,547,675 B2 | 1/2017 | Bostock | |
| 9,582,606 B2 | 2/2017 | Pitschke | |
| 10,061,678 B2 | 8/2018 | Jovanovic et al. | |
| 10,776,330 B2 | 9/2020 | Bregler et al. | |
| 11,301,451 B1 | 4/2022 | Cseri et al. | |
| 2001/0049682 A1 * | 12/2001 | Vincent ................. | G06F 16/284 |
| 2004/0249830 A1 * | 12/2004 | Sonkin ................ | G06F 9/45512 |

(Continued)

OTHER PUBLICATIONS

SQL Change Automation 4 Documentation, Pre-deployment and post-deployment scripts, Red Gate Software Ltd, available at: https://documentation.red-gate.com/sca/developing-databases/concepts/migrations/pre-deployment-and-post-deployment-scripts (last accessed Apr. 21, 2022), last updated Dec. 14, 2020.

(Continued)

*Primary Examiner* — Apu M Mofiz
*Assistant Examiner* — Cindy Nguyen
(74) *Attorney, Agent, or Firm* — Ryan, Mason & Lewis, LLP

(57) ABSTRACT

Methods, apparatus, and processor-readable storage media for automatically sequencing database objects are provided herein. An example computer-implemented method includes obtaining one or more database scripts to be executed on at least one database, wherein each database script is associated with one or more database objects; for each of the database scripts: parsing the database script to identify object information corresponding to the one or more database objects associated with the database script, and determining one or more dependencies of the one or more database objects based at least in part on the object information; automatically determining an order to execute the one or more database scripts based at least in part on the object dependencies of the one or more database objects determined for each of the database scripts; and initiating an execution the one or more database scripts in accordance with the determined order.

20 Claims, 10 Drawing Sheets

(56) References Cited

U.S. PATENT DOCUMENTS

| | | | |
|---|---|---|---|
| 2007/0055693 A1* | 3/2007 | Galbraith | G06F 16/217 |
| 2015/0019479 A1* | 1/2015 | Buehne | G06F 16/214 |
| | | | 707/609 |
| 2015/0019497 A1 | 1/2015 | Bostock | |
| 2015/0149421 A1 | 5/2015 | Foebel et al. | |
| 2015/0161181 A1 | 6/2015 | Doms | |
| 2016/0036858 A1 | 2/2016 | Chieu et al. | |
| 2016/0292210 A1 | 10/2016 | Panse et al. | |
| 2016/0378634 A1 | 12/2016 | Jovanovic et al. | |
| 2017/0019314 A1 | 1/2017 | Chieu | |
| 2017/0068692 A1 | 3/2017 | Bostock | |
| 2017/0103100 A1 | 4/2017 | Sharma et al. | |
| 2017/0180205 A1 | 6/2017 | Baset et al. | |
| 2018/0210910 A1 | 7/2018 | Collins et al. | |
| 2019/0005074 A1 | 1/2019 | Bregler et al. | |
| 2019/0026320 A1* | 1/2019 | Sharma | G06F 16/212 |
| 2019/0179934 A1 | 6/2019 | Gogineni et al. | |
| 2019/0196890 A1 | 6/2019 | Bucchi et al. | |
| 2019/0384847 A1* | 12/2019 | Bobbala | G06F 16/2282 |
| 2020/0334244 A1* | 10/2020 | Hammerschmidt | G06F 16/86 |
| 2021/0034474 A1* | 2/2021 | Khandkar | G06F 11/1469 |
| 2021/0182248 A1 | 6/2021 | Jayanthi | |
| 2022/0137937 A1 | 5/2022 | Saha | |
| 2023/0281173 A1 | 9/2023 | Jaisawal | |

OTHER PUBLICATIONS

Walker, Bob, available at: https://octopus.com/blog/dbup-database-deployment-automation (last accessed Apr. 21, 2022), Mar. 24, 2020.

* cited by examiner

```
500
CREATE OR REPLACE VIEW [CountryA Customers] AS
SELECT CustomerName, ContactName, City
FROM Customers
WHERE Country = 'CountryA'
```

CREATE TABLE Supplier (
    SupplierNumber  INTEGER NOT NULL,
    Name            VARCHAR (20) NOT NULL,
    Address         VARCHAR (50) NOT NULL,
    TYPE            VARCHAR(10),
    CONSTRAINT supplier_pk PRIMARY KEY(SupplierNumber),
    CONSTRAINT number_value CHECK (SupplierNumber > 0) )

CREATE TABLE Invoices (
    InvoiceNumber   INTEGER NOT NULL,
    SupplierNumber  INTEGER NOT NULL,
    Text            VARCHAR (4096),
    CONSTRAINT invoice_pk PRIMARY KEY(InvoiceNumber),
    CONSTRAINT inumber_value CHECK(InvoiceNumber > 0),
    CONSTRAINT supplier_fk FOREIGN KEY(SupplierNumber)
        REFERENCES Supplier (SupplierNumber)
        ON UPDATE CASCADE ON DELETE RESTRICT )
```

FIG. 6

```
CREATE OR REPLACE VIEW [CountryA Customers] AS
SELECT *
FROM Supplier;
- - - - - - - - - - - - - - - - - - - - - - - -
CREATE TABLE Supplier (
    SupplierNumber  INTEGER NOT NULL,
    Name            VARCHAR (20) NOT NULL,
    Address         VARCHAR (50) NOT NULL,
    TYPE            VARCHAR(10),
    CONSTRAINT supplier_pk PRIMARY KEY(SupplierNumber),
    CONSTRAINT number_value CHECK (SupplierNumber > 0) );

CREATE TABLE Invoices (
    InvoiceNumber   INTEGER NOT NULL,
    SupplierNumber  INTEGER NOT NULL,
    Text            VARCHAR (4096),
    CONSTRAINT invoice_pk PRIMARY KEY(InvoiceNumber),
    CONSTRAINT inumber_value CHECK(InvoiceNumber > 0),
    CONSTRAINT supplier_fk FOREIGN KEY(SupplierNumber)
        REFERENCES Supplier (SupplierNumber)
        ON UPDATE CASCADE ON DELETE RESTRICT );
```

AUTOMATIC SEQUENCING OF DATABASE OBJECTS

FIELD

The field relates generally to information processing systems, and more particularly to managing database objects using such systems.

BACKGROUND

Database objects often need to be sequenced to determine an order for executing database scripts as part of database code deployments, for example. Generally, the database objects are sequenced based on filenames assigned to the database scripts by users. The process for naming the files is often inefficient and can result in errors and/or conflicts, for example.

SUMMARY

Illustrative embodiments of the disclosure provide techniques for automatically sequencing database objects. An exemplary computer-implemented method includes obtaining one or more database scripts to be executed on at least one database, wherein each database script is associated with one or more database objects; for each of the database scripts: parsing the database script to identify object information corresponding to the one or more database objects associated with the database script, and determining one or more dependencies of the one or more database objects based at least in part on the object information; automatically determining an order to execute the one or more database scripts based at least in part on the object dependencies of the one or more database objects determined for each of the database scripts; and initiating an execution of the one or more database scripts in accordance with the determined order.

Illustrative embodiments can provide significant advantages relative to conventional database object sequencing techniques. For example, technical problems associated with managing the sequence of database objects are overcome in one or more embodiments by automatically sequencing the database scripts based at least in part on characteristics identified for each script (e.g., object types, object names, object operations, and/or constraints).

These and other illustrative embodiments described herein include, without limitation, methods, apparatus, systems, and computer program products comprising processor-readable storage media.

BRIEF DESCRIPTION OF THE DRAWINGS

FIGS. 5-7 show examples of database code that can be processed in accordance with illustrative embodiments.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Generally, users name files according to a particular naming convention (e.g., using number prefixes) in order to deploy or execute database objects or scripts (e.g., structured query language (SQL) scripts) with the proper dependencies. Conventional techniques for managing code deployments may use a manual file naming process. This process can cause conflicts in the execution order of software, which often requires users (e.g., developers) to utilize resources to manage the execution order. The names of the files frequently include numbers (e.g., 1_filename, 2_filename, etc.) that are used to determine the execution order. As the number of files increases, the likelihood that a filename is named incorrectly also increases.

Additionally, users often work in teams that are in multiple geographical locations. When files are manually named, it can be difficult to keep the files synchronized. For example, consider a situation where a first user and a second user are working simultaneously, and each user creates a file having the same prefix. This can cause a conflict in the sequence of the execution order of database objects as two files have the same prefix. In order to avoid and/or address this conflict, additional time is needed for the users to coordinate with each other.

Exemplary embodiments described herein include an automatic sequencing process that identifies and manages dependencies of database objects as part of database code deployments. In some embodiments, the sequencing of the database objects is identified by generating a dependency list of existing objects in a target database and parsing the file contents to identify object characteristics. The object characteristics can include, for example, at least one of an object type, an object name, an operation, and key constraints for any new objects.

Figure 1:
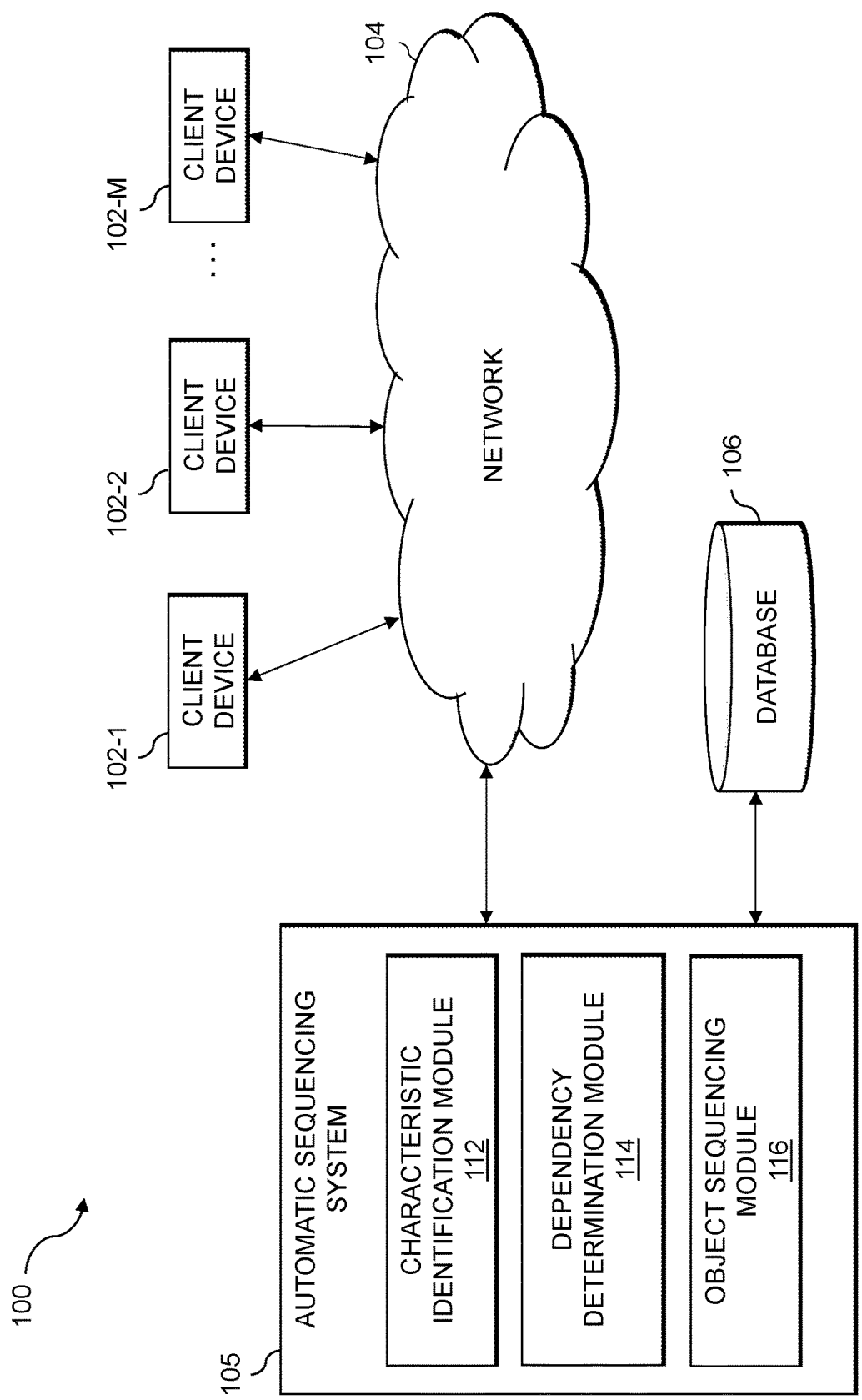
FIG. 1 shows an information processing system configured for automatically sequencing database objects in an illustrative embodiment.

FIG. 1 shows a computer network (also referred to herein as an information processing system) 100 configured in accordance with an illustrative embodiment. The computer network 100 comprises a plurality of client devices 102-1, 102-2, . . . 102-M, collectively referred to herein as client devices 102. The client devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is an automatic sequencing system 105.

The client devices 102 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The client devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the automatic sequencing system 105 and/or client devices 102 can have at least one associated database 106 configured to store data pertaining to, for example, software code.

An example database 106, such as depicted in the present embodiment, can be implemented using one or more storage systems associated with the automatic sequencing system 105 and/or the client devices 102. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the automatic sequencing system 105 are one or more input-output devices, which illustratively comprise keyboards, displays or other types of input-output devices in any combination. Such input-output devices can be used, for example, to support one or more user interfaces to the automatic sequencing system 105, as well as to support communication between automatic sequencing system 105 and other related systems and devices not explicitly shown.

Additionally, the automatic sequencing system 105 in the FIG. 1 embodiment is assumed to be implemented using at least one processing device. Each such processing device generally comprises at least one processor and an associated memory, and implements one or more functional modules for controlling certain features of the automatic sequencing system 105.

More particularly, the automatic sequencing system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the automatic sequencing system 105 to communicate over the network 104 with the client devices 102, and illustratively comprises one or more conventional transceivers.

In the FIG. 1 embodiment, the automatic sequencing system 105 further comprises a characteristic identification module 112, a dependency determination module 114, and an object sequencing module 116.

The automatic sequencing system 105 obtains database objects from the client devices 102 and sequences the obtained database objects before they are deployed to the database 106, for example. Generally, the characteristic identification module 112 identifies characteristics of the obtained objects, and the dependency determination module 114 determines the dependencies corresponding to each of the obtained objects. The dependencies, in some embodiments, are determined based on whether or not a given one of the database objects exists in the database 106 (which is also referred to as the target database), as described in more detail elsewhere herein. The object sequencing module 116 sequences the database objects based at least in part on the dependencies identified by the dependency determination module 114.

It is to be appreciated that this particular arrangement of modules 112, 114 and 116 illustrated in the automatic sequencing system 105 of the FIG. 1 embodiment is presented by way of example only, and alternative arrangements can be used in other embodiments. For example, the functionality associated with the modules 112, 114 and 116 in other embodiments can be combined into a single module, or separated across a larger number of modules. As another example, multiple distinct processors can be used to implement different ones of the modules 112, 114 and 116 or portions thereof.

At least portions of modules 112, 114 and 116 may be implemented at least in part in the form of software that is stored in memory and executed by a processor.

It is to be understood that the particular set of elements shown in FIG. 1 for automatic sequencing system 105 involving client devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the automatic sequencing system 105 and database(s) 106 can be on and/or part of the same processing platform. Additionally, although the automatic sequencing system 105 is shown separate from the client devices 102, it is to be appreciated that, in at least some embodiments, the functionality associated with modules 112, 114, and 116 can be implemented at least in part by one or more of the client devices 102.

An exemplary process utilizing modules 112, 114 and 116 of an example automatic sequencing system 105 in computer network 100 will be described in more detail with reference to, for example, the flow diagrams of FIGS. 2 and 8.

Figure 2:
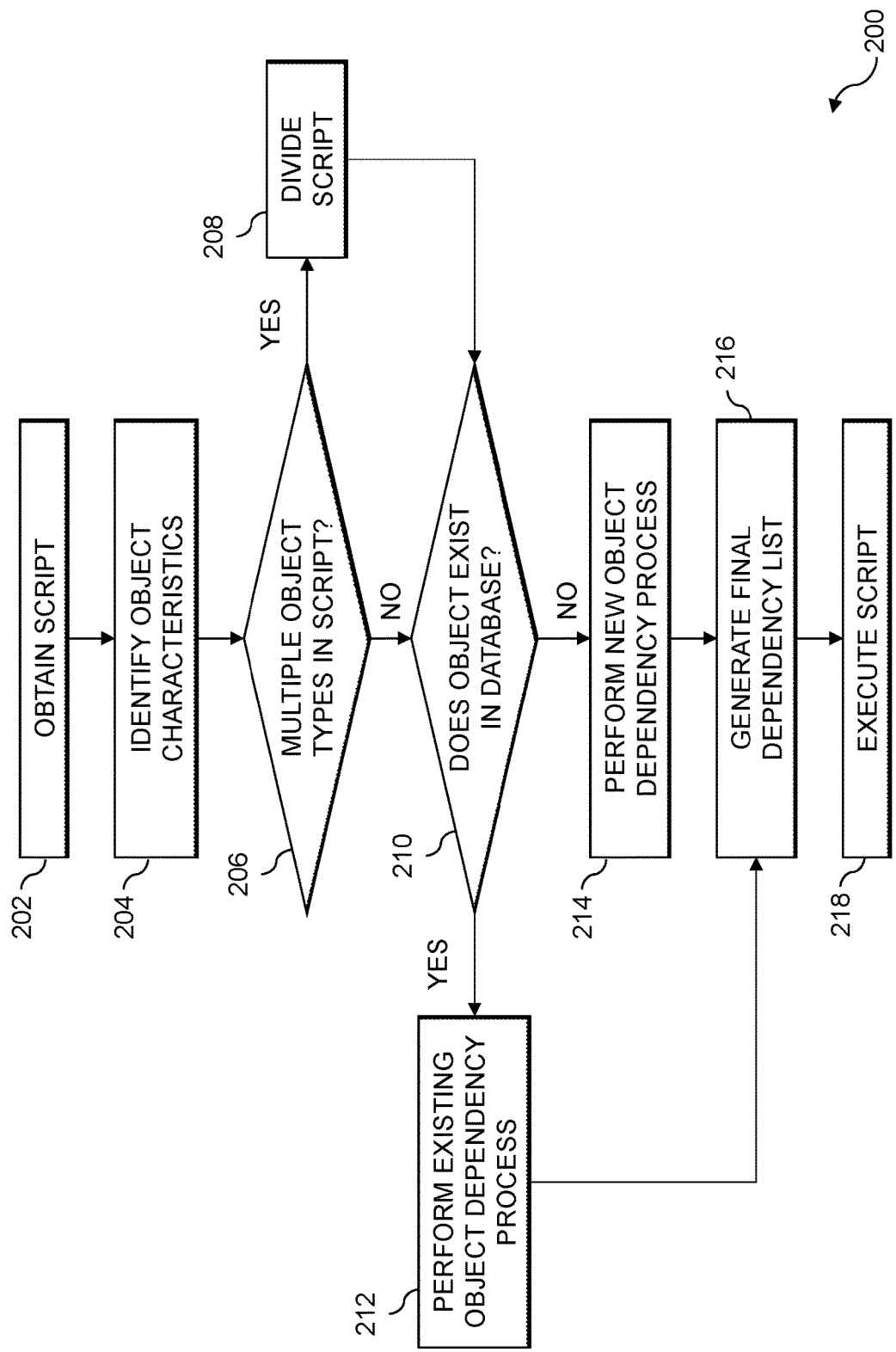
FIG. 2 shows a process flow diagram for automatically sequencing database objects in an illustrative embodiment.

FIG. 2 shows a flow diagram of a process 200 in an illustrative embodiment. Step 202 includes obtaining a script. It is assumed that the script is associated with one or more types of database objects. Step 204 includes identifying object characteristics corresponding to database objects in the script. For example, the object characteristics can include one or more object types, object names, object operations, and primary/foreign key constraints.

Step 206 performs a test to determine whether multiple object types are in the script. If yes, then step 208 is performed which includes dividing the script into single object types (e.g., using a query block syntax). If no, then the process continues to step 210.

Step 210 includes checking whether each object exists in the target database. If a given object exists in the target database, then step 212 includes performing an existing object dependency process or algorithm. Generally, the existing object dependency process identifies dependencies for the database objects. An example of such a process is described in more detail in conjunction with FIG. 3, for example. If an object does not exist in the target database, then the process continues to step 214, which includes performing a new object dependency process to determine the dependencies of the new object. An example of a new object dependency process is described in more detail in conjunction with FIG. 4, for example. Step 216 includes generating a final dependency list. Step 218 includes executing the script in accordance with the final dependency list.

The process depicted in FIG. 2, in some embodiments, is performed for multiple scripts. By way of example, multiple scripts can be obtained at step 202, and steps 204-214 can be performed for each script (e.g., in a sequential manner). In such embodiments, the final dependency list generated at step 216 includes the dependencies for all of the objects across all of the scripts, for example.

Figure 3:
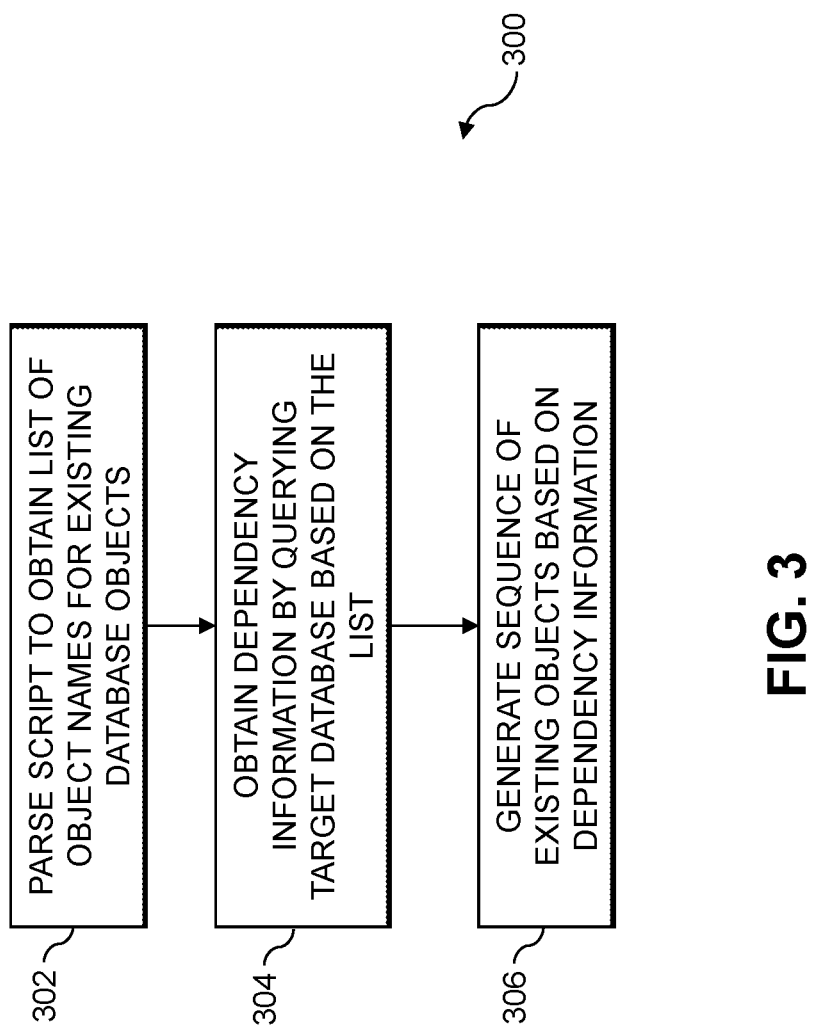
FIG. 3 shows a process for identifying dependencies of existing database objects in an illustrative embodiment.

Referring now to FIG. 3, this figure shows an example of an existing object dependency process 300 in an illustrative embodiment. The process 300 may be implemented at least in part by automatic sequencing system 105 using dependency determination module 114, for example.

Step 302 includes parsing a database script to identify a list of one or more object names for existing database objects in a target database.

Step 304 includes obtaining dependency information by querying the target database based on the list of object names. In some embodiments, it is assumed that the target database includes a built-in table (often referred to as an "all dependencies table") having a list of dependent objects in the target database. Thus, step 304 can include executing one or more queries based on the list of object names to obtain the corresponding dependency information from the built-in table for each of the existing database objects.

Step 306 includes generating a sequence of the existing objects based on the dependency information obtained at step 304.

Figure 4:
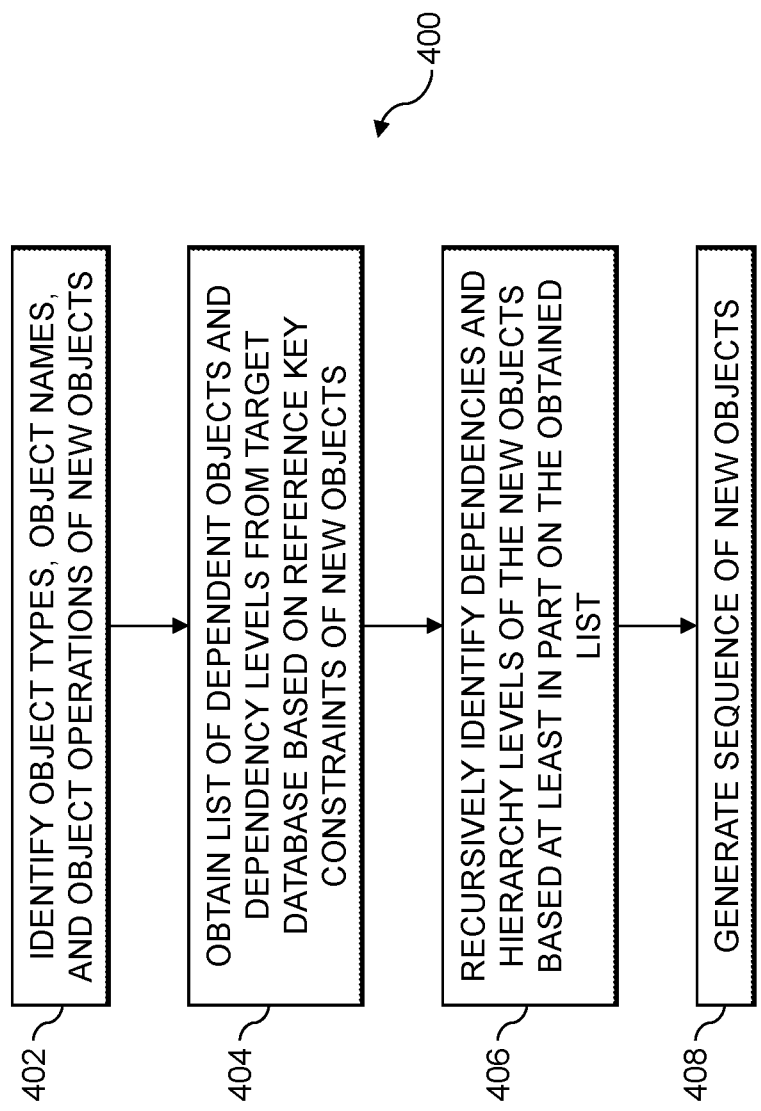
FIG. 4 shows a process for identifying dependencies of new database objects in an illustrative embodiment.

Referring now to FIG. 4, this figure shows an example of a new object dependency process 400 in an illustrative embodiment. The process 400 may be implemented at least in part by automatic sequencing system 105 using dependency determination module 114, for example.

Step 402 includes identifying object types, object names, and object operations of new objects (e.g., objects that are determined not to exist in the target database at step 210). Step 404 includes obtaining a list of dependent objects and dependency levels from the target database based on reference key constraints of the new objects. Step 406 includes recursively identifying dependencies and hierarchy levels of the new objects based at least in part on the obtained list of dependent objects. Step 408 includes generating a sequence of the new objects based at least in part on the results of step 406.

As an example, step 406 may include identifying objects that have no dependencies. Such objects correspond to a first hierarchy level, which excludes objects having foreign key references. In some embodiments, dependent objects are recursively identified by capturing the foreign key references and using regular expressions. The object hierarchy can be given based on the number of dependent objects. The results can then be ordered by object type, object operation, and/or object hierarchy level, for example. To handle circular references, scripts can be written to separate referential constraints from the creation of the original table schema, for example.

Also, in some embodiments, the process 400 in FIG. 4 may include parsing the new objects into data definition language (DDL) and/or data manipulation language (DML) operations based on a set of keywords. For example, the set of keywords may correspond to object types (e.g., TABLE, VIEW, etc.) and/or object operations (e.g., INSERT, UPDATE, DELETE, etc.). The operations can then be separated based on the type of operations (e.g., DDL and DML), and the object names and operations can be dynamically parsed from the script.

FIGS. 5-7 show examples of SQL code that can be processed in accordance with illustrative embodiments. In this example, the existing object dependency algorithm (as described above in conjunction with FIGS. 2 and 3, for example) can be applied to the SQL code 500 to determine the existing dependencies of the view object, assuming it exists in the database.

Referring now to FIG. 6, the example SQL code 600 represents a script that creates a supplier table and an invoices table in a database. In this example, the supplier table specifies attributes for each supplier, which include a SupplierNumber (used to identify a given supplier), a name, and an address; and each record in the invoices table includes an InvoiceNumber attribute and a SupplierNumber attribute. The SQL code 600 also indicates that the SupplierNumber attribute is the primary key in the supplier table, and the foreign key in the invoices table points to that primary key. In some embodiments, the SQL code 600 is processed using the new object dependency process 400. For example, the SQL code 600 can be parsed to identify new objects (e.g., the invoices and supplier tables), object names, and operations in the SQL code 600. The primary and foreign keys in the SQL code 600 can be identified to obtain the list of dependent objects and the levels of dependencies for the new objects, for example.

Referring now to FIG. 7, the SQL code 700 shows an example of a single script having multiple individual parts. The SQL code 700, in some embodiments, can be processed to separate the script into multiple parts as indicated by the dashed line. For example, some embodiments include identifying individual parts of the SQL code 700 by identifying blocks for each query, which are then divided into parts. The individual parts can be processed in a similar manner as described in conjunction with SQL code 500 and SQL code 600, for example. Each part, in some embodiments, is treated as a single temporary script, and the parts are ordered based on the determined dependencies.

Accordingly, one or more embodiments allow a team of developers to create database scripts without having to use a predefined naming convention (e.g., based on number prefixes) for determining an order in which the scripts are to be executed. As an example, some embodiments include creating an installation folder followed by object types and object names. Before deploying the scripts to the database, the scripts are parsed to identify object types, object names, and object operations. The dependencies of the objects are identified recursively. The scripts are ordered based on the determined dependencies.

Figure 8:
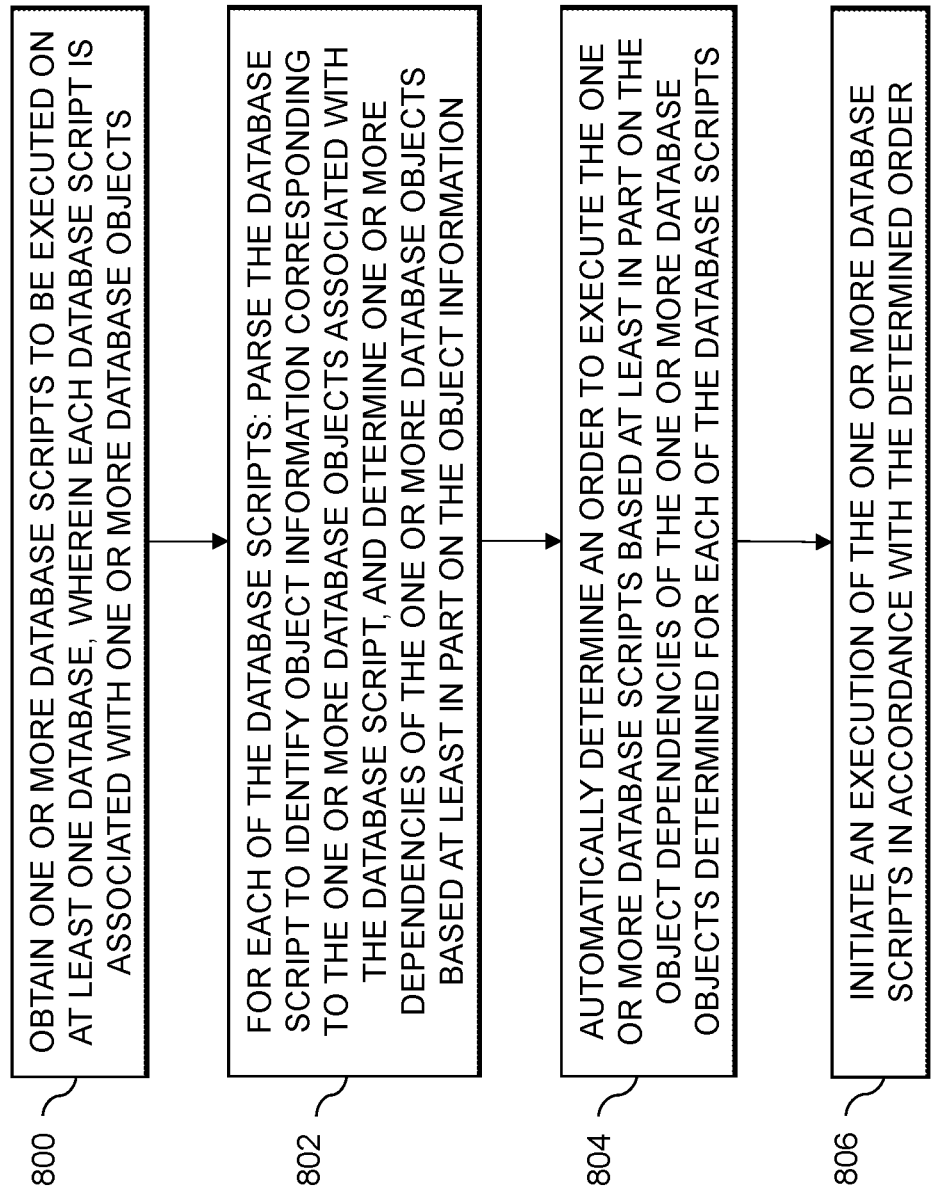
FIG. 8 shows a flow diagram of a process for automatically sequencing database objects in an illustrative embodiment.

FIG. 8 is a flow diagram of a process for automatically sequencing database objects in an illustrative embodiment. It is to be understood that this particular process is only an example, and additional or alternative processes can be carried out in other embodiments.

In this embodiment, the process includes steps 800 through 806. These steps are assumed to be performed by the automatic sequencing system 105 utilizing its modules 112, 114 and 116.

Step 800 includes obtaining one or more database scripts to be executed on at least one database, wherein each database script is associated with one or more database objects. Step 802 includes, for each of the database scripts: parsing the database script to identify object information corresponding to the one or more database objects associated with the database script, and determining one or more dependencies of the one or more database objects based at least in part on the object information. Step 804 includes automatically determining an order to execute the one or more database scripts based at least in part on the object dependencies of the one or more database objects determined for each of the database scripts. Step 806 includes initiating an execution of the one or more database scripts in accordance with the determined order.

The execution of the one or more database scripts may include applying changes to the at least one database with respect to the one or more database objects in the determined order. The object information may include at least one of: one or more object types, one or more object names, and one or more object operations. Determining the one or more dependencies of the one or more database objects may include: determining that at least one of the one or more database objects exists in the at least one database; obtaining a list of dependent objects that exist in the at least one database; and comparing the list of dependent objects to the object information. Determining the one or more dependencies of the one or more database objects may include: determining that at least one of the one or more database objects is a new database object; identifying one or more reference keys associated with the new database object based on the object information; and determining the one or more dependencies of the new database object based on the one or more reference keys. The one or more dependencies of the new database object may be determined in a recursive manner based on one or more reference keys, wherein the one or more reference keys include at least one of: one or more foreign keys and one or more primary keys. The determining the one or more dependencies of the new database object may include generating a dependency hierarchy for the new database object. The process in FIG. 8 may include the steps of: determining that at least one of the database scripts is associated with two or more database object types; and dividing the at least one of the database scripts into multiple parts, wherein each of the parts corresponds to one of the two or more database object types. The parsing may be based at least in part on a set of keywords corresponding to a database scripting language.

Accordingly, the particular processing operations and other functionality described in conjunction with the flow diagram of FIG. 8 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant technical solutions relative to conventional approaches. For example, some embodiments are configured to significantly reduce errors and/or conflicts associated with database objects for software code deployments. These and other embodiments can effectively overcome problems associated with conventional techniques that rely on manually assigned filenames to determine the order in which database scripts are executed. For example, some embodiments are configured to automatically identify dependencies of database objects and sequence such objects based on the dependencies. These and other embodiments can improve user experience and effectively reduce conflicts and/or errors relative to conventional approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. Although described in the context of system 100, these platforms may also be used to implement at least portions of other information processing systems in other embodiments.

Figure 9:
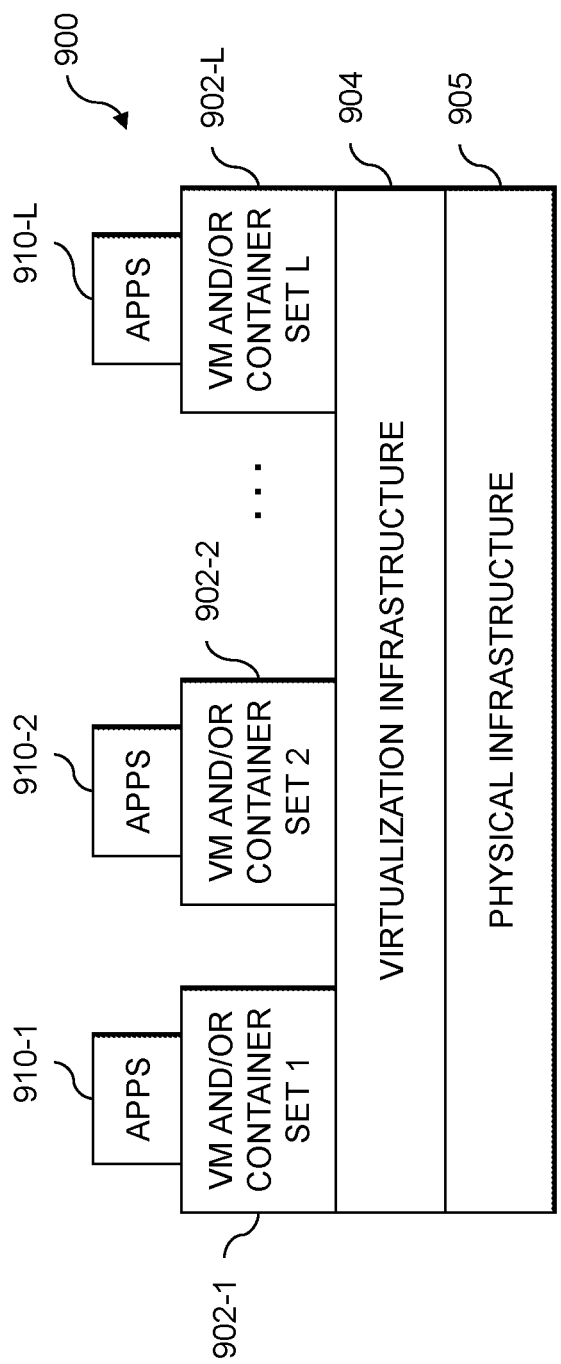
FIGS. 9 and 10 show examples of processing platforms that may be utilized to implement at least a portion of an information processing system in illustrative embodiments.
Figure 10:
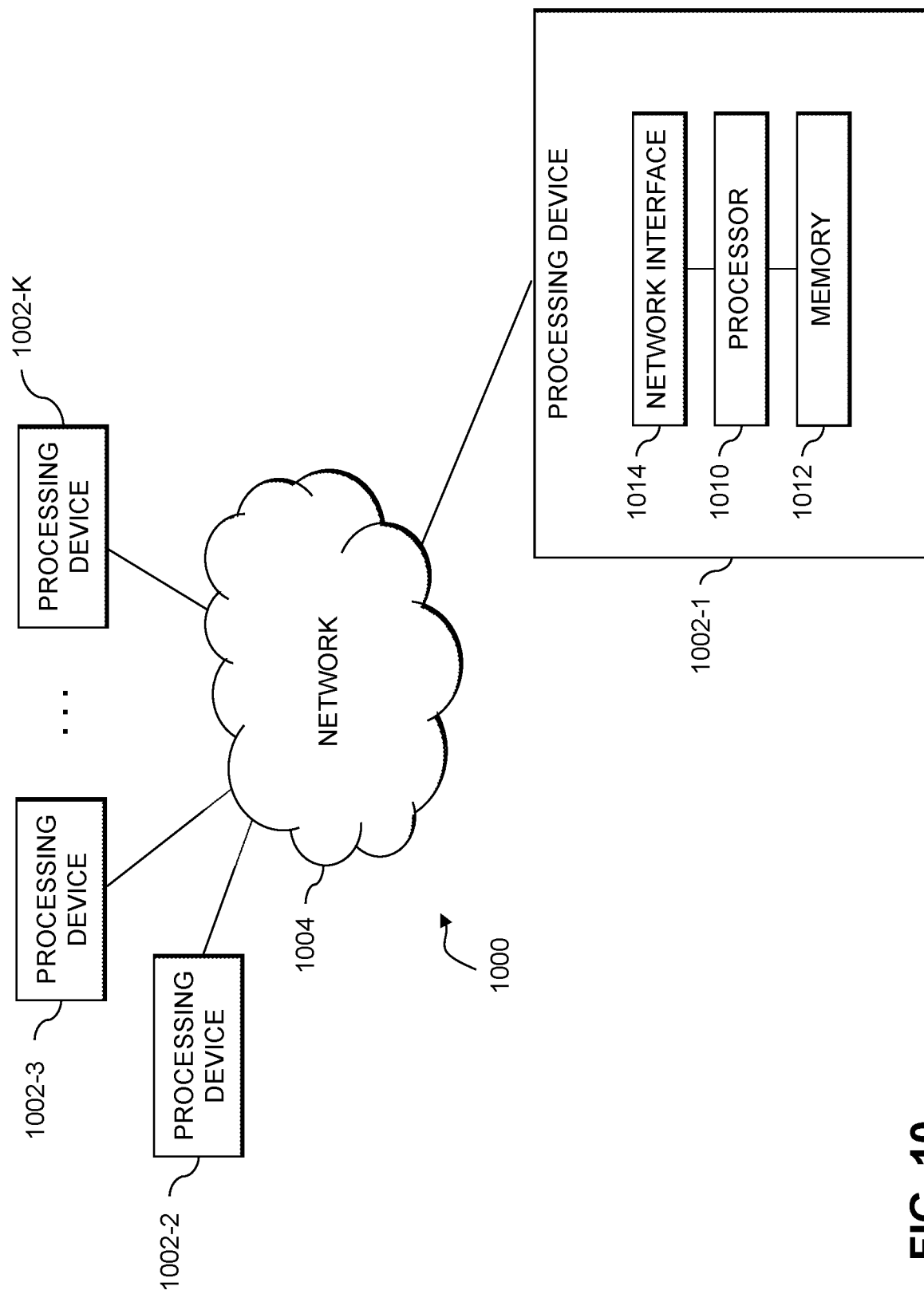

FIG. 9 shows an example processing platform comprising cloud infrastructure 900. The cloud infrastructure 900 comprises a combination of physical and virtual processing resources that are utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 comprise respective VMs, respective sets of one or more containers, or respective sets of one or more containers running in VMs. In some implementations of the FIG. 9 embodiment, the VMs/container sets 902 comprise respective VMs implemented using virtualization infrastructure 904 that comprises at least one hypervisor.

A hypervisor platform may be used to implement a hypervisor within the virtualization infrastructure 904, wherein the hypervisor platform has an associated virtual infrastructure management system. The underlying physical machines comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1002-1 in the processing platform 1000 comprises a processor 1010 coupled to a memory 1012.

The processor 1010 comprises a microprocessor, a microcontroller, an ASIC, a FPGA or other type of processing circuitry, as well as portions or combinations of such circuitry elements.

The memory 1012 comprises RAM, ROM or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   obtaining two or more database scripts to be executed on at least one database, wherein each database script is associated with one or more database objects and comprises at least one value indicative of an order in which the database script is to be executed, and wherein the at least one value for at least two of the database scripts comprises a same value that creates a conflict in an execution order of the two or more database scripts;
   determining that at least one of the database scripts is associated with two or more database object types and, in response, dividing the at least one database script into multiple parts, wherein each of the parts corresponds to one of the two or more database object types;
   for each of the two or more database scripts: parsing the database script to identify object information corresponding to the one or more database objects associated with the database script, and determining one or more dependencies of the one or more database objects based at least in part on the object information, wherein at least one of the one or more database objects for at least one of the two or more database scripts comprises a new database object that does not exist in the at least one database, and wherein the determining comprises: (i) obtaining information corresponding to dependent objects and dependency levels associated with the new database object based on one or more reference keys associated with the new database object and (ii) recursively identifying one or more dependencies for the new database object based at least in part on the obtained information;
   automatically adjusting the order in which the two or more database scripts are to be executed to resolve the conflict in the execution order, wherein the adjusting is based at least in part on the object dependencies of the one or more database objects determined for each of the two or more database scripts; and
   initiating an execution of the two or more database scripts in accordance with the adjusted order;
   wherein the method is performed by at least one processing device comprising a processor coupled to a memory.

2. The computer-implemented method of claim 1, wherein the execution of the two or more database scripts comprises applying changes to the at least one database with respect to the one or more database objects in the adjusted order.

3. The computer-implemented method of claim 1, wherein the object information comprises at least one of: one or more object types, one or more object names, and one or more object operations.

4. The computer-implemented method of claim 1, wherein the determining the one or more dependencies of the one or more database objects comprises:
   determining that at least one of the one or more database objects exists in the at least one database;
   obtaining a list of dependent objects that exist in the at least one database, wherein obtaining the list of dependent objects that exist in the at least one database comprises querying an all dependencies table of the at least one database; and
   comparing the list of dependent objects to the object information.

5. The computer-implemented method of claim 1, wherein the determining the one or more dependencies for the new database object comprises:
   identifying the one or more reference keys associated with the new database object based on the object information.

6. The computer-implemented method of claim 5, wherein at least one of:
   the one or more reference keys comprise at least one of: one or more foreign keys and one or more primary keys; and
   the determining the one or more dependencies of the new database object further comprises generating a dependency hierarchy for the new database object based at least in part on the obtained information.

7. The computer-implemented method of claim 1, wherein the parsing is based at least in part on a set of keywords corresponding to a database scripting language.

8. The computer-implemented method of claim 1, wherein the obtaining the information corresponding to the dependent objects and the dependency levels associated with the new database object is based on a combination of one or more foreign keys and one or more primary keys.

9. The computer-implemented method of claim 1, wherein the dependency levels associated with the new database object comprise:
   a first dependency level comprising database objects having no dependencies; and
   one or more second dependency levels comprising database objects having one or more foreign key references.

10. The computer-implemented method of claim 1, wherein the at least one value indicative of the order in which the database script is to be executed corresponds to a filename prefix.

11. The computer-implemented method of claim 1, wherein the parsing the database script further comprises parsing the database script into one or more data definition language operations and one or more data manipulation language operations, and wherein the one or more data manipulation language operations and the one or more data definition language operations are separated, based on a type of the operations, for determining the one or more dependencies.

12. A non-transitory processor-readable storage medium having stored therein program code of one or more software programs, wherein the program code when executed by at least one processing device causes the at least one processing device:
   to obtain two or more database scripts to be executed on at least one database, wherein each database script is associated with one or more database objects and comprises at least one value indicative of an order in which the database script is to be executed, and wherein the at least one value for at least two of the database scripts comprises a same value that creates a conflict in an execution order of the two or more database scripts;
   to determine that at least one of the database scripts is associated with two or more database object types and, in response, to divide the at least one database script into multiple parts, wherein each of the parts corresponds to one of the two or more database object types;
   for each of the two or more database scripts: to parse the database script to identify object information corresponding to the one or more database objects associated with the database script, and to determine one or more dependencies of the one or more database objects based at least in part on the object information, wherein at least one of the one or more database objects for at least one of the two or more database scripts comprises a new database object that does not exist in the at least one database, and wherein the determining comprises: (i) obtaining information corresponding to dependent objects and dependency levels associated with the new database object based on one or more reference keys associated with the new database object and (ii) recursively identifying one or more dependencies for the new database object based at least in part on the obtained information;
   to automatically adjust the order in which the two or more database scripts are to be executed to resolve the conflict in the execution order, wherein the adjusting is based at least in part on the object dependencies of the one or more database objects determined for each of the two or more database scripts; and
   to initiate an execution of the two or more database scripts in accordance with the adjusted order.

13. The non-transitory processor-readable storage medium of claim 12, wherein the execution of the two or more database scripts comprises applying changes to the at least one database with respect to the one or more database objects in the adjusted order.

14. The non-transitory processor-readable storage medium of claim 12, wherein the object information comprises at least one of: one or more object types, one or more object names, and one or more object operations.

15. The non-transitory processor-readable storage medium of claim 12, wherein the determining the one or more dependencies of the one or more database objects comprises:
   determining that at least one of the one or more database objects exists in the at least one database;
   obtaining a list of dependent objects that exist in the at least one database, wherein obtaining the list of dependent objects that exist in the at least one database comprises querying an all dependencies table of the at least one database; and
   comparing the list of dependent objects to the object information.

16. The non-transitory processor-readable storage medium of claim 12, wherein the determining the one or more dependencies for the new database object comprises:
   identifying the one or more reference keys associated with the new database object based on the object information.

17. An apparatus comprising:
   at least one processing device comprising a processor coupled to a memory;
   the at least one processing device being configured:
   to obtain two or more database scripts to be executed on at least one database, wherein each database script is associated with one or more database objects and comprises at least one value indicative of an order in which the database script is to be executed, and wherein the at least one value for at least two of the database scripts comprises a same value that creates a conflict in an execution order of the two or more database scripts;
   to determine that at least one of the database scripts is associated with two or more database object types and, in response, to divide the at least one database script into multiple parts, wherein each of the parts corresponds to one of the two or more database object types;
   for each of the two or more database scripts: to parse the database script to identify object information corresponding to the one or more database objects associated with the database script, and to determine one or more dependencies of the one or more database objects based at least in part on the object information, wherein at least one of the one or more database objects for at least one of the two or more database scripts comprises a new database object that does not exist in the at least one database, and wherein the determining comprises: (i) obtaining information corresponding to dependent objects and dependency levels associated with the new database object based on one or more reference keys associated with the new database object and (ii) recursively identifying one or more dependencies for the new database object based at least in part on the obtained information;
   to automatically adjust the order in which the two or more database scripts are to be executed to resolve the conflict in the execution order, wherein the adjusting is based at least in part on the object dependencies of the one or more database objects determined for each of the two or more database scripts; and to initiate an execution of the two or more database scripts in accordance with the adjusted order.

18. The apparatus of claim 17, wherein the execution of the two or more database scripts comprises applying changes to the at least one database with respect to the one or more database objects in the adjusted order.

19. The apparatus of claim 17, wherein the object information comprises at least one of: one or more object types, one or more object names, and one or more object operations.

20. The apparatus of claim 17, wherein the determining the one or more dependencies of the one or more database objects comprises:

determining that at least one of the one or more database objects exists in the at least one database;

obtaining a list of dependent objects that exist in the at least one database, wherein obtaining the list of dependent objects that exist in the at least one database comprises querying an all dependencies table of the at least one database; and comparing the list of dependent objects to the object information.

\* \* \* \* \*